United States Patent [19]
Labat et al.

[11] Patent Number: 5,219,677
[45] Date of Patent: Jun. 15, 1993

[54] RECHARGEABLE ELECTROCHEMICAL CELL HAVING A CATHODE BASED ON VANADIUM OXIDE

[75] Inventors: Jean Labat, St Medard en Jalles; Jean-Michel Cocciantelli, Talence, both of France

[73] Assignee: SAFT, Romainville, France

[21] Appl. No.: 625,714

[22] Filed: Dec. 11, 1990

[30] Foreign Application Priority Data

Dec. 11, 1989 [FR] France ............... 89 16337

[51] Int. Cl.$^5$ .......................................... H01M 4/58
[52] U.S. Cl. ................................... 429/50; 429/218; 429/194
[58] Field of Search .............. 429/218, 194, 50; 252/182.1

[56] References Cited

U.S. PATENT DOCUMENTS

| | | | |
|---|---|---|---|
| 4,596,752 | 6/1986 | Faul et al. | 429/218 |
| 4,803,137 | 2/1989 | Miyazaki et al. | 429/194 |
| 4,874,680 | 10/1989 | Koshiba et al. | 429/197 |

FOREIGN PATENT DOCUMENTS

| | | |
|---|---|---|
| 2615657 | 11/1988 | France . |
| 2629947 | 10/1989 | France . |

OTHER PUBLICATIONS

Extended Abstracts, vo. 89-2, Fall Meeting, Hollywood, Fla., Oct. 15-20, 1989, pp. 62-63, Abstract No. 44; S. Okada et al.: "Lithium insertin reaction of crystalline and amorphous V$_2$O$_5$ (-P$_2$O$_5$) cathodes".
Journal of Power Sources, vol. 20, 1987, pp. 157-164, Elsevier Sequoia, NL; K. Wiesener et al.: "Vanadium oxides in electrodes for rechargeable lithium cells".
Proceedings of the Symposium on Primary and Secondary Ambient Temperature Lithium Batteries, Honolulu, Oct. 18-23, 1987, vol. 88-6, 1989, pp. 503-510, Electrochemical Society, Pennington, US; M. Sugawara et al.: "Electrochemical behaviour of Vanadium(V) oxide in propylene carbonate-LiCl04".
Proceedings of the Symposium on Primary and Secondary Ambient Temperature Lithium Batteries, Honolulu, Oct. 18-23, 1987, vol. 88-6, pp. 494-502, Electrochemical Society, Pennington, US; J. Labat et al.: "Oxide based intercalation compounds for organic electrolyte rechargeable lithium cells".
Electrochimica ACTA, vol. 33, No. 7, 1988, pp. 997-1002, Pergamon Press Plc, GB; S. Hub et al.: "X-ray investigation on electroformed Li$_x$V$_2$O$_5$ bronzes".
Journal of Power Sources, vol. 24, 1988, pp. 85-93, Elsevier Sequoia, NL; A. Tranchant et al.: "A comparative electrochemical study of MoO3, V2O5 and MoV2O8 as rechargeable cathodes in lithium cells".

*Primary Examiner*—Mark L. Bell
*Assistant Examiner*—C. M. Bonner
*Attorney, Agent, or Firm*—Sughrue, Mion, Zinn, Macpeak & Seas

[57] ABSTRACT

A rechargeable electrochemical cell whose anode is based on lithium or a lithium alloy, whose electrolyte is constituted by a solution of a lithium salt in a non-aqueous solvent, and whose cathode material is based on crystallized vanadium oxide, wherein the vanadium oxide contains a $\gamma'$ phase due to chemical or electrochemical oxidation of a $\gamma$ phase of LiV$_2$O$_5$ obtained by inserting a number of atoms of lithium per mole of V$_2$O$_5$ into said oxide, where said number lies in the range 0.9 to 2.

13 Claims, 17 Drawing Sheets

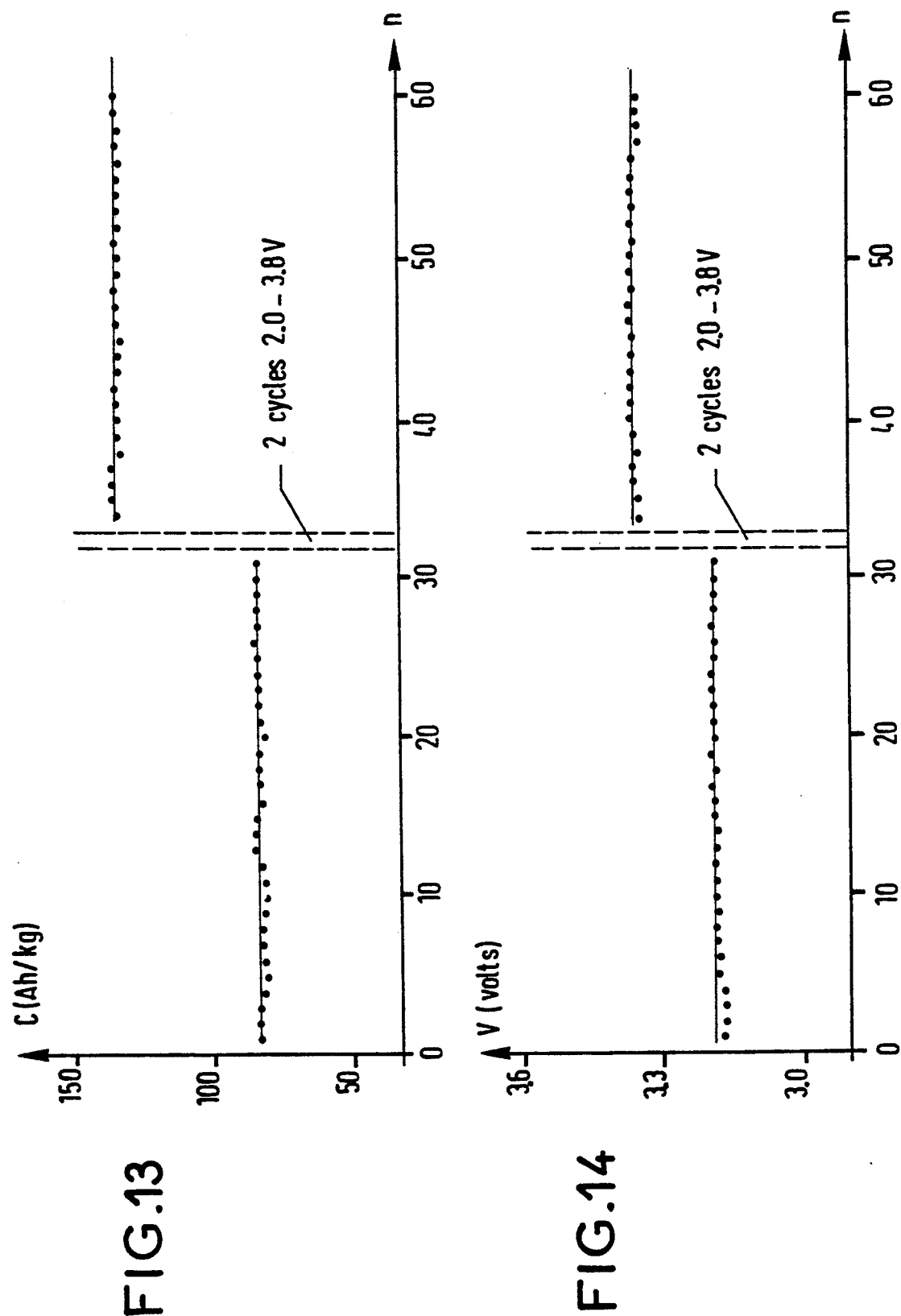

RECHARGEABLE ELECTROCHEMICAL CELL HAVING A CATHODE BASED ON VANADIUM OXIDE

The present invention relates to a rechargeable electrochemical cell having a lithium anode, a non-aqueous electrolyte, and a cathode material based on vanadium oxide $V_2O_5$.

BACKGROUND OF THE INVENTION

Numerous metallic oxides and sulfides have been proposed as cathode active materials for rechargeable electrochemical cells having a lithium anode. Among the oxides, vanadium oxide $V_2O_5$ has been studied to a large extent. It was hoped that electrodes could be obtained having very high energy per unit mass because of the low atomic mass and the high oxidation number (+5) of the vanadium in this material. In addition, $V_2O_5$ is substance which is easily obtained and which is easily worked industrially into the form of electrodes.

It is known that during the first discharge of an Li/$V_2O_5$ cell, it is possible to insert more than three atoms of lithium per molecule of $V_2O_5$ at a plurality of voltage levels on "plateaus" situated respectively at about 3.3 volts, 3.2 volts, 2.3 volts, and below 2.0 volts. However this system is thought to be reversible during a charge-discharge cycle only on the condition that its operation is limited to the two levels above 3 V, which correspond to inserting the first atom of lithium in $V_2O_5$. Beyond this limit, it is generally accepted that inserting a greater quantity of lithium gives rise to irreversible modifications in the initial structure of the material, thereby giving rise to a progressive and rapid reduction in capacity during cycling (cf. "Lithium Vanadium Pentoxide Cells" by C. R. Walk in "Lithium Batteries," Academic Press, 1983, p. 265, and "Vanadium Oxides in Electrodes for Rechargeable Lithium Cells" by K. Wiesener et al. *Journal of Power Sources* 20, 1987, p. 157).

It is also known that the amorphisation of crystalized $V_2O_5$ obtained by ultrarapid quenching of molten $V_2O_5$ or by forming solid solutions of $V_2O_5$ with various different oxides such as $P_2O_5$, $TeO_2$, $GeO_2$, etc., can serve to increase the reversible domain of lithium intercalation to about 1.5 Li per molecule of $V_2O_5$, but in this case the voltage falls off regularly during discharge and the mean voltage over the entire duration of discharge is no more than about 2.6 V (see French patent FR-A-2 573 250, for example).

An object of the invention is to increase the energy per unit mass of rechargeable electrochemical cells including vanadium oxide as a cathode material.

SUMMARY OF THE INVENTION

The present invention provides a rechargeable electrochemical cell whose anode is based on lithium or on a lithium alloy, whose electrolyte is constituted by a solution of a lithium salt in a non-aqueous solvent, and whose cathode material is based on crystallized vanadium oxide, wherein the vanadium oxide contains a $\gamma'$ phase due to chemical or electrochemical oxidation of a $\gamma$ phase of $LiV_2O_5$ obtained by inserting a number of atoms of lithium per molecule of $V_2O_5$ into said oxide where said number lies in the range 0.9 to 2.

This number is preferably as close as possible to 2. Said material makes it possible:

to increase the discharge voltage of the generator; and to increase the capacity that can be used while cycling by increasing the reversible domain for lithium intercalation in $V_2O_5$.

Thus, said cathode material demonstrates a capacity, when cycled electrochemically between 0.2 V and 3.8 V, of not less than 88 Ah/kg/mole at a discharge voltage of greater than 3.3 V.

The discharge characteristic curve includes a plurality of distinct voltage levels or "plateaus" situated above 3 volts, and a voltage level situated at substantially 2.3 volts.

In addition, said cathode material has a mean discharge voltage greater than 3.5 volts when cycled with a limited depth of discharge, i.e. less than a value of 74 Ah/kg.

In a first variant, the said material is obtained in situ by a partial or total initial discharging of the cell below 3 V down to a first level situated at about 2.3 V, with subsequent charging up to 3.8 V. Discharging must not be continued to the level below about 2 V since that would destroy the structure of the material and its electrochemical characteristics would be profoundly disturbed: the appearance of the charge/discharge curve would change and there would be a loss of cycling reversibility as mentioned above.

Unexpectedly, discharging down to 2.3 V followed by charging fully up to 3.8 V as applied to an $\alpha$ vanadium oxide of mediocre quality enables the capacity of the oxide to be regenerated and increases the mean voltage of the storage cell by about 0.2 volts.

In a second variant, the said cathode material is obtained by chemically oxidizing $\gamma$ $LiV_2O_5$ treated with an oxidizing solution such as bromine in acetonitrile at ambient temperature. The bromine concentration may be 0.1 moles/liter.

The non-aqueous electrolyte of a cell of the invention is constituted by a solvent selected from linear or cyclic ethers, esters, or mixtures thereof, and a solute selected from $LiAsF_6$, $LiCF_3SO_3$, $LiBF_4$, $LiPF_6$, $LiClO_4$, and mixtures thereof.

The electrolyte is preferably a solution of $LiAsF_6$ in a mixture of propylene carbonate and ethylene carbonate. In a variant, the electrolyte is a solution of $LiAsF_6$ in a mixture of propylene carbonate, ethylene carbonate, and dimethoxyethane.

BRIEF DESCRIPTION OF THE DRAWINGS

Implementations of the invention are described by way of example with reference to the accompanying drawings, in which:

FIG. 13 is a graph showing variation in the specific capacity of the cathode material of the button cell $B_5$ as a function of number of cycles together with the corresponding curve for button cell $B'_5$ after two cycles of operation between 2.0 V and 3.8 V; and FIG. 14 is a graph showing variation in the discharge voltage of the cathode material of button cell $B_5$ as a function of number of cycles, together with the corresponding curve for button cell $B'_5$ after two cycles of operation between 2.0 V and 3.8 V.

DETAILED DESCRIPTION

Figure 1:
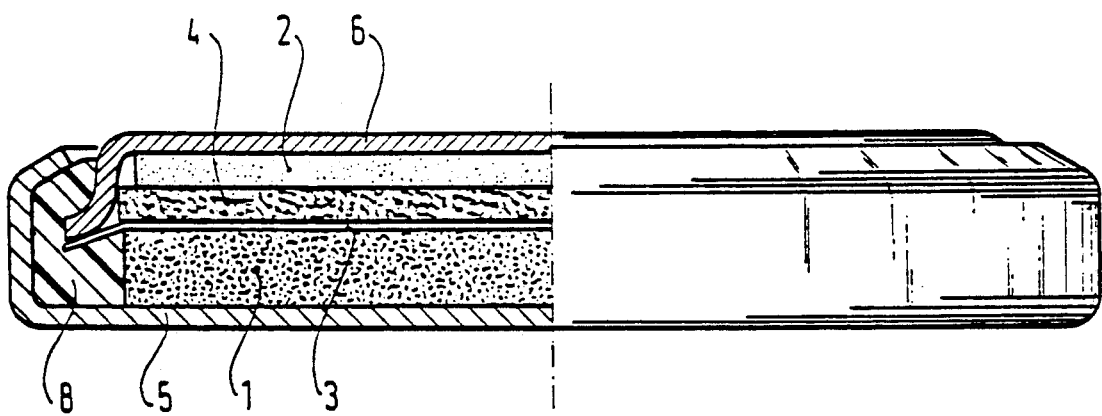
FIG. 1 is a highly diagrammatic half-section view of an example of a rechargeable electrochemical cell of the button type.

In order to demonstrate the characteristics and advantages of the invention compared with the prior art, button storage cells of the type shown in FIG. 1 were made as follows.

Battery quality commercial crystalized V₂O₅ cathode material was intimately mixed with acetylene black, graphite, and polytetrafluoroethylene (PTFE) in the following proportions by weight: 80%, 7.5%, 7.5%, and 5%. A cathode 1 was made by incrusting a certain quantity of this mixture on a stainless steel grid. After drying and cutting using an appropriate tool, an electrode was obtained in the form of a disk having a diameter of 20 mm and a thickness of about 0.5 mm, containing about 150 mg of V₂O₅. The anode 2 was constituted by a disk of lithium having the same diameter and a mass of about 150 mg.

The electrolyte used was a molar solution of lithium hexafluoroarsenate in a mixture of propylene carbonate, ethylene carbonate, and dimethoxyethane in the following proportions by weight, respectively: 25%, 25%, and 50%.

The electrodes 1 and 2 were separated by a macroporous polypropylene separator 3 and by a reservoir separator 4 made of polypropylene fibers in the form of a felt.

The assembly was disposed in a cup 5 closed in sealed manner by a cover 6 and a seal 8.

EXAMPLE 1

Two button type storage cells $B_1$ and $B_2$ were made as shown in FIG. 1 and subjected to charge/discharge cycles with a charging current of 1 mA and with a discharge current of 2 mA. Charging was performed up to a maximum voltage of 3.8 V for both cells $B_1$ and $B_2$. Discharging was stopped at a minimum voltage of 2.8 V for prior art cell $B_1$ and at 2.0 V for cell $B_2$ of the invention.

Figure 2:
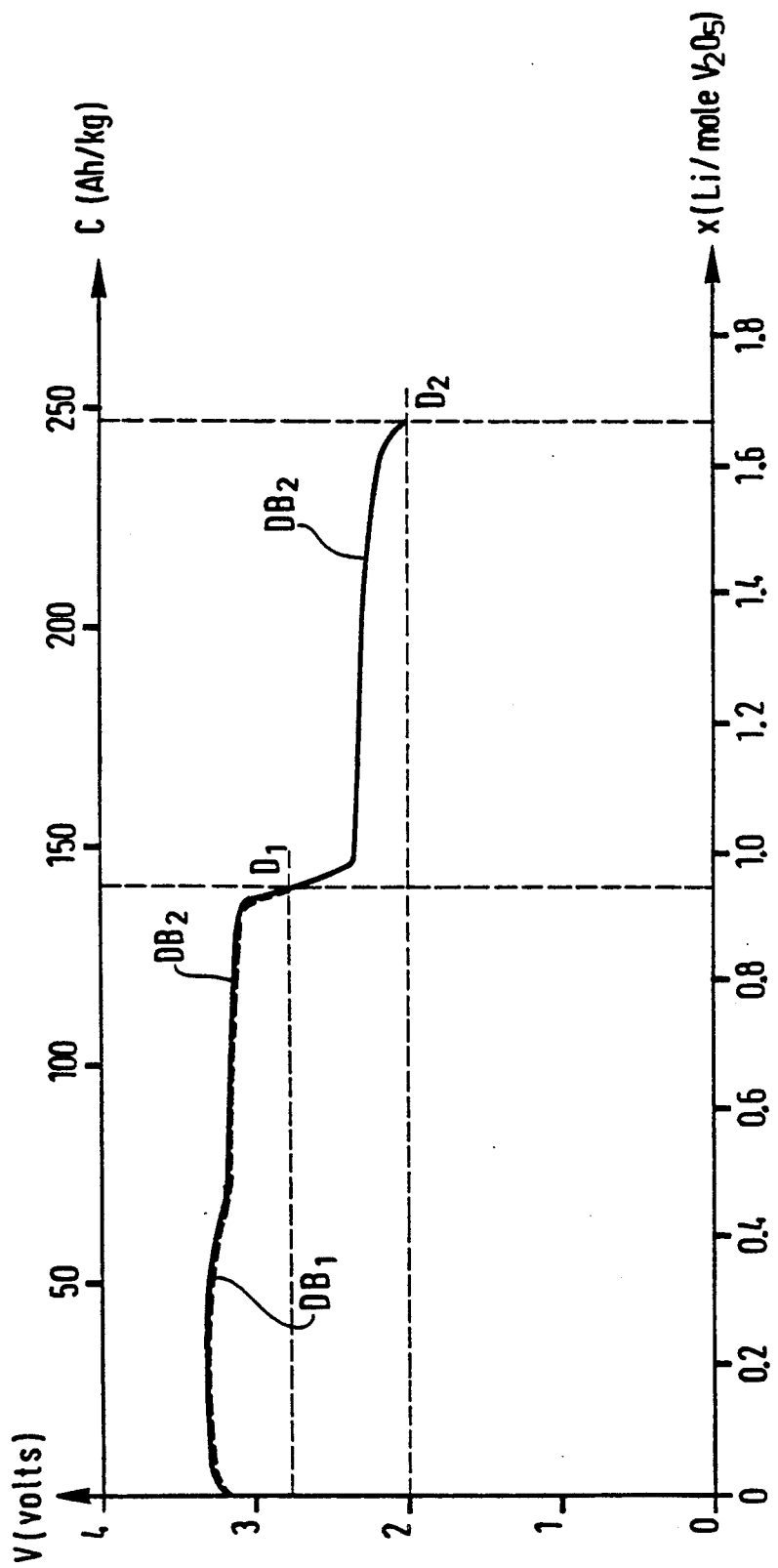
FIG. 2 shows first discharge curves for two button cells, namely a prior art button cell $B_1$ discharged down to 2.8 V, and a cell $B_2$ of the invention discharged down to 2.0 V.

FIG. 2 shows the variation in voltage V as a function of the number "x" of intercalated lithium atoms per mole of V₂O₅ during the first discharge. The corresponding specific capacity "C" (in Ah/kg) for V₂O₅ is also shown. Discharge curves $DB_1$ and $DB_2$ are associated respectively with cells $B_1$ and $B_2$.

It can be seen that for both $B_1$ and $B_2$, discharging down to 2.8 V (point $D_1$) takes place via two voltage levels (3.3 V and 3.15 V) that are very close together, thereby enabling 0.4 atom of lithium to be inserted per mole of V₂O₅. This corresponds to a specific capacity of V₂O₅ equal to 138 Ah/kg for cell $B_1$. Continued discharging of cell $B_2$ down to 2 V (point $D_2$) takes place via another voltage level at about 2.3 V and enables a total of 1.67 lithium atoms to be inserted per mole of V₂O₅, corresponding to a specific capacity for the V₂O₅ equal to 245 Ah/kg.

Figure 3:
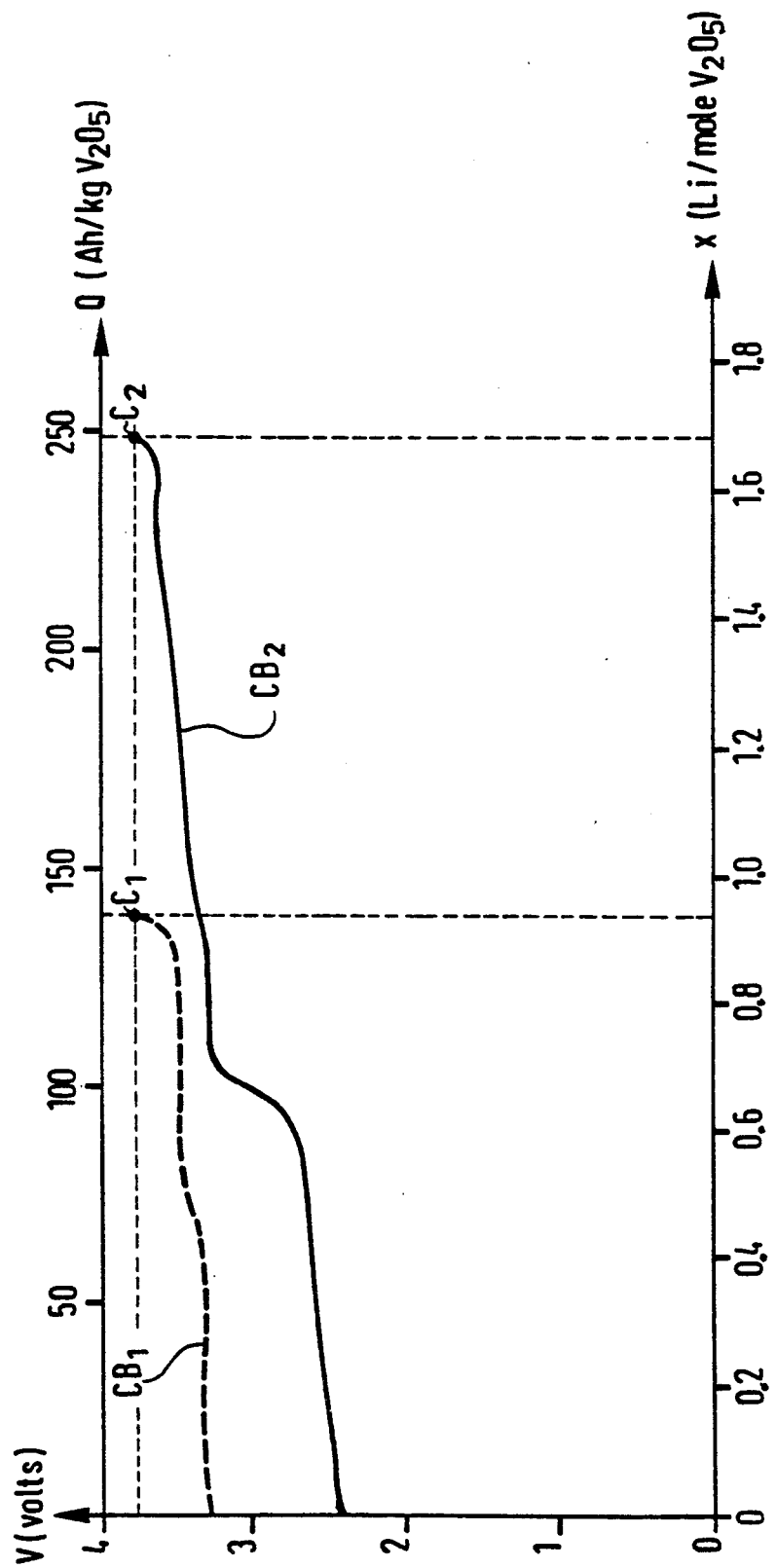
FIG. 3 shows first re-charging curves up to 3.8 V as applied to button cells $B_1$ and $B_2$ after they have been discharged as shown in FIG. 2.

FIG. 3 shows the variation in voltage V as a function of the number "x" of lithium atoms de-intercalated per mole of V₂O₅ during the first charge up to 3.8 V as performed on the cells $B_1$ and $B_2$ after the above discharge. $CB_1$ and $CB_2$ are charging curves associated respectively with $B_1$ and $B_2$. The quantity Q of charged electricity is also shown (in Ah/kg of V₂O₅).

The charging curve $CB_1$ for cell $B_1$ as interrupted at point $C_1$ shows the same two voltage levels as were observed during the initial discharge. However cell $B_2$ began charging at a level of about 2.6 V corresponding to its discharge level at 2.3 V, and then the portion of its curve above 3 V is different from that of cell $B_1$. For both cells $B_1$ and $B_2$, the quantity of electricity charged is identical to the capacity it delivered during the preceding discharge, which demonstrates that lithium intercalation is thoroughly reversible in both of the operating ranges under investigation, namely 3.8 V to 2.8 V, and 3.8 V to 2.0 V.

Figure 4:
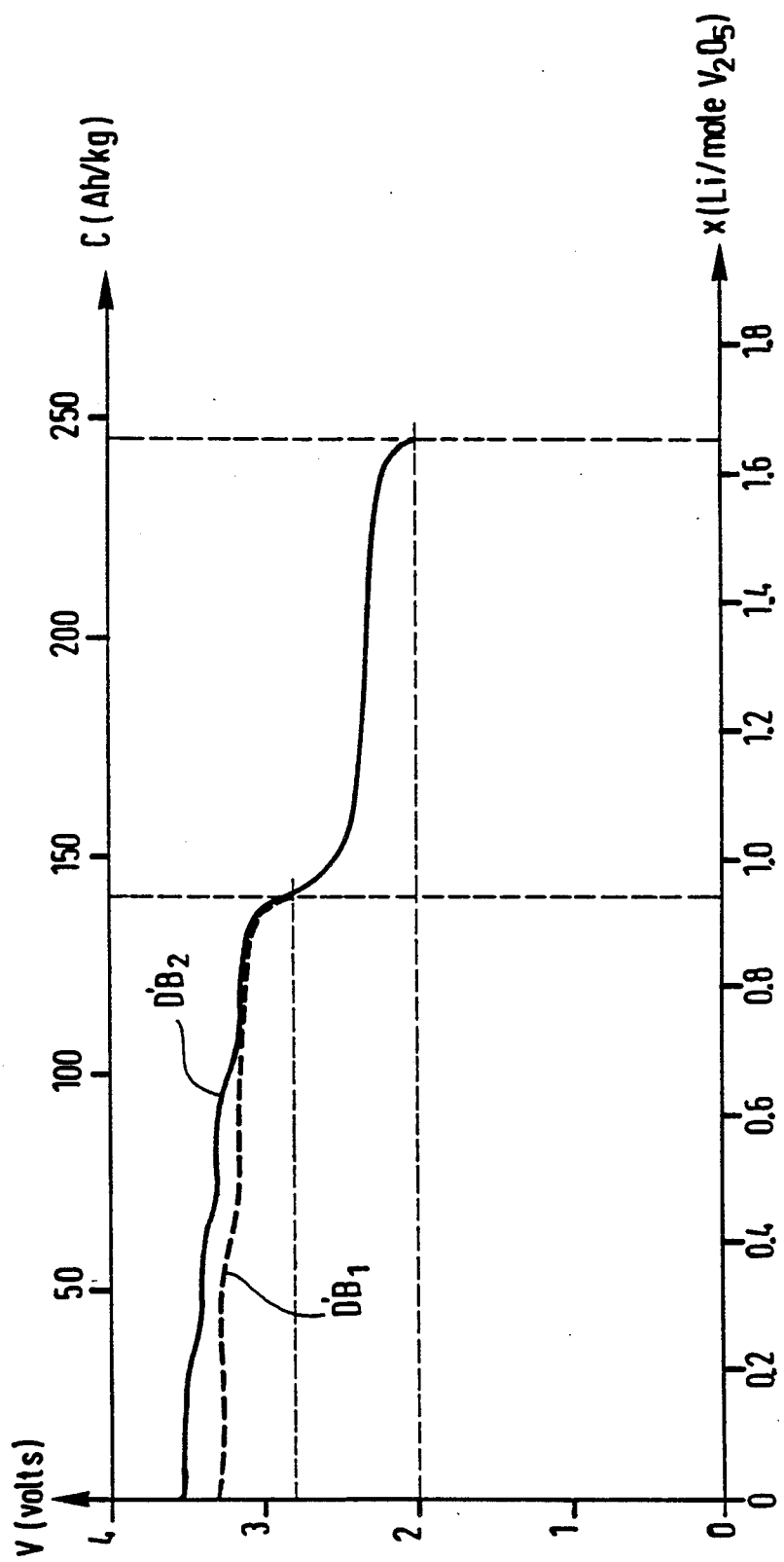
FIG. 4 shows second discharge curves for the two button cells $B_1$ and $B_2$ being discharged respectively down to 2.8 V and 2.0 V.
Figure 5:
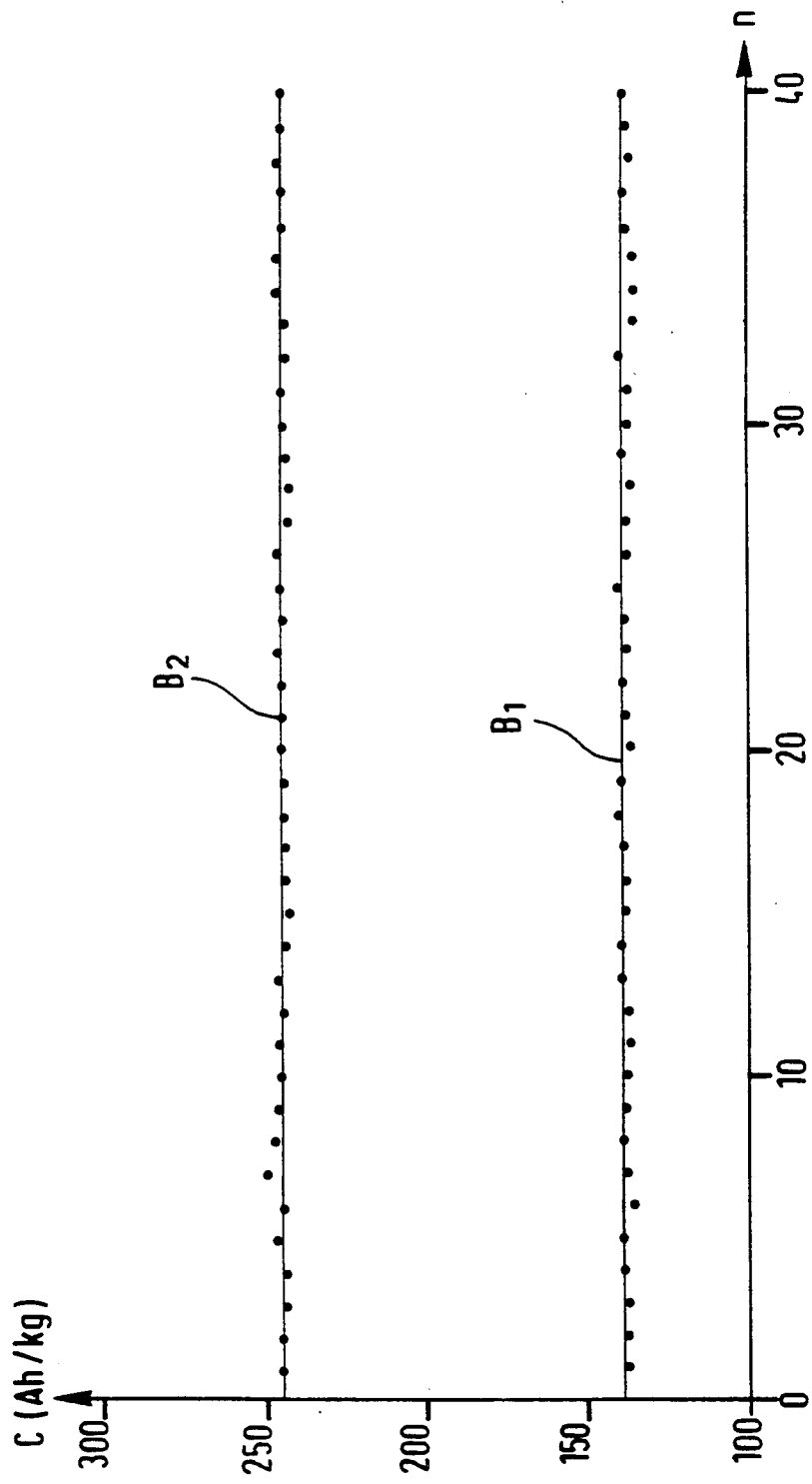
FIG. 5 is a graph showing changes in the specific capacity of the cathode material of the two button cells $B_1$ and $B_2$ as a function of number of cycles n.

FIG. 4 is similar to FIG. 2 and shows the characteristics obtained during the second discharges of the cells $B_1$ and $B_2$. Cell $B_1$ operated in the same manner as during its first cycle: discharge curve $D'B_1$ is identical to curve $DB_1$ of FIG. 2. In contrast, as can be seen from curve $D'B_2$, above 3 V, cell $B_2$ had a discharge voltage that was about 0.2 V higher than that of cell $B_1$ and than that obtained on the same cell $B_2$ during its initial discharge (see curve $DB_2$ in FIG. 2). As for the first cycle, discharging ended on a level at about 2.3 V. The capacities delivered during this discharge were identical to those of the first cycle and these capacities were maintained during subsequent cycles as shown in FIG. 5 which is a graph of measured specific capacity "C" as a function of number of cycles "n" for the cathode material of cells $B_1$ and $B_2$.

These results clearly show the advantage of the invention which gives rise to a considerable increase in the usable energy per unit mass of V₂O₅. This energy corresponds to the product of the specific capacity multiplied by the mean voltage during discharge and is equal to 440 Wh/kg for cell $B_1$ and to 710 Wh/kg for cell $B_2$, i.e. to an increase of more than 60%.

The invention provides two other main advantages. In order to provide an electrode of determined capacity per unit area, a smaller quantity of $V_2O_5$ is required than in the prior art, and thus the thickness of the electrode can be smaller. In the available volume corresponding to a given format, e.g. using spiral technology, it becomes possible to house electrodes of greater surface area, thereby making it possible in any given application to reduce current density and electrode polarization phenomena. The resulting advantage is an improvement in discharge characteristics, particularly at high currents and at low temperatures, and also an improved lifetime in cycles. The second advantage is that it becomes possible to determine the discharge state of a battery on the basis of its operating voltage since discharge takes place over a plurality of clearly distinct voltage levels or plateaus (see FIG. 4).

In order to understand the differences in electrochemical behavior of the cathode materials of cells $B_1$ and $B_2$, X-ray diffraction tests were performed on samples taken during the above tests and using the K $\alpha$ radiation of copper. In all of the diffraction diagrams of FIGS. 6a to 6e which follow, the diffraction angle $2\theta$ is plotted along the X axis. The spectrum line marked C corresponds to the graphite used as an additive in the manufacture of the cathodes.

Figure 6A:
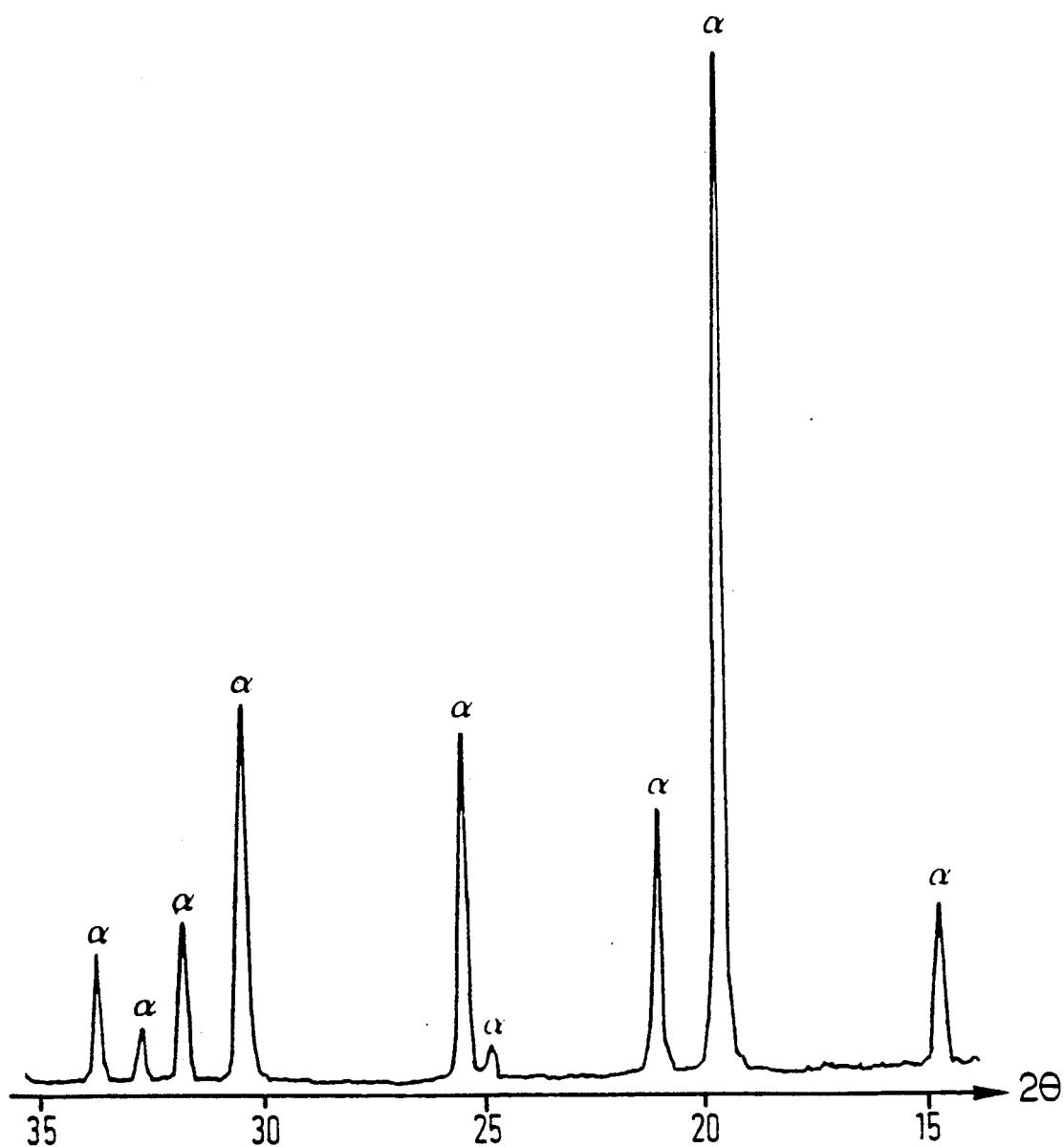
FIG. 6a is an X-ray diffraction diagram for commercial α V₂O₅ oxide.

FIG. 6a is an X-ray diffraction diagram of commercially available $V_2O_5$ oxide as used for making the cathodes of the cells $B_1$ and $B_2$. The spectrum obtained shows that this material has the well known previously determined structure of a crystallized $\alpha$ $V_2O_5$ oxide (R. Enjalbert and J. Galy, Acta Cryst. C 42, 1467–1986, and the references included therein).

Figure 6B:
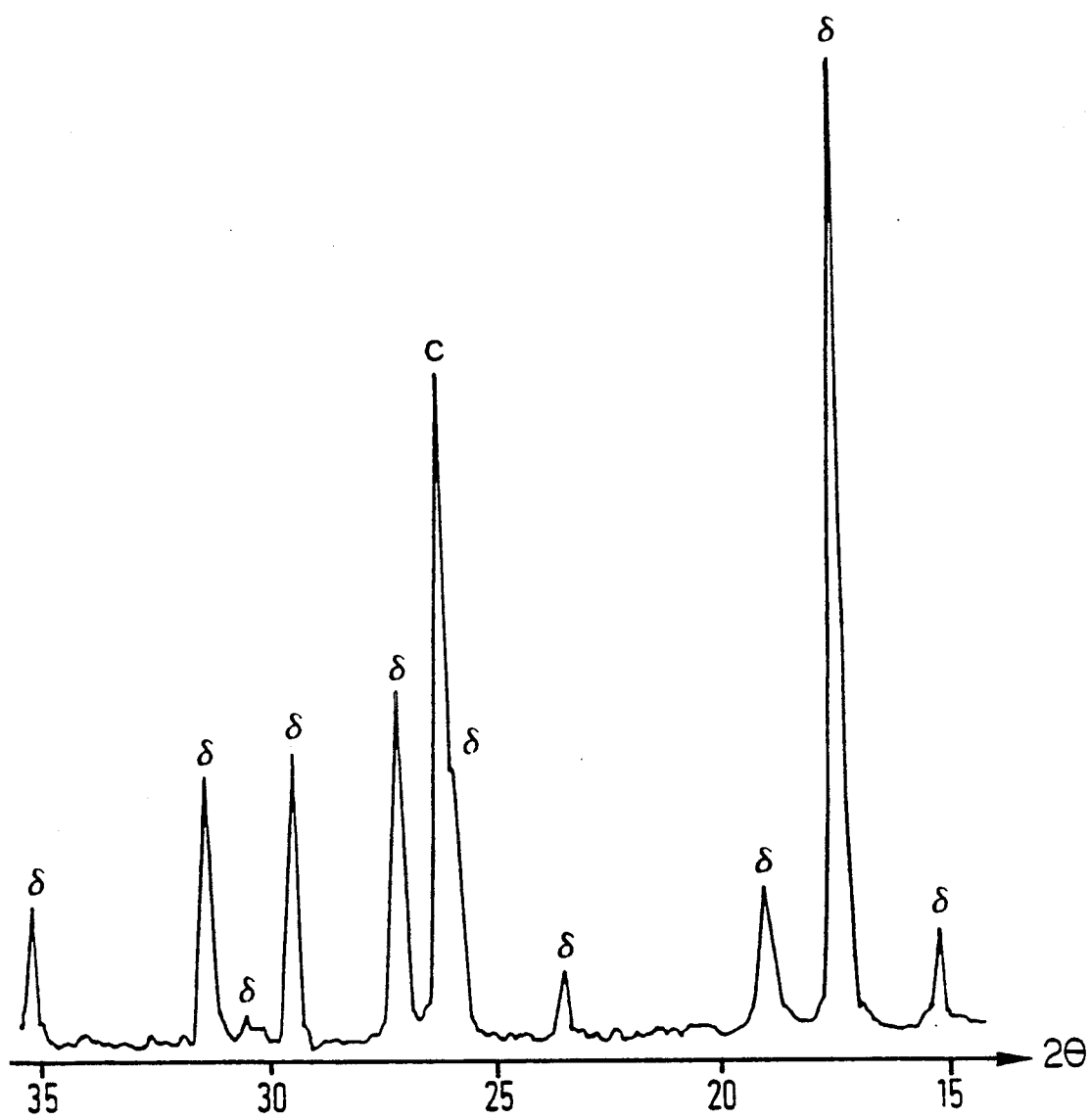
FIG. 6b is an X-ray diffraction diagram for the cathode material of button cell $B_1$ at the end of its first discharge (point $D_1$ in FIG. 2)
Figure 6C:
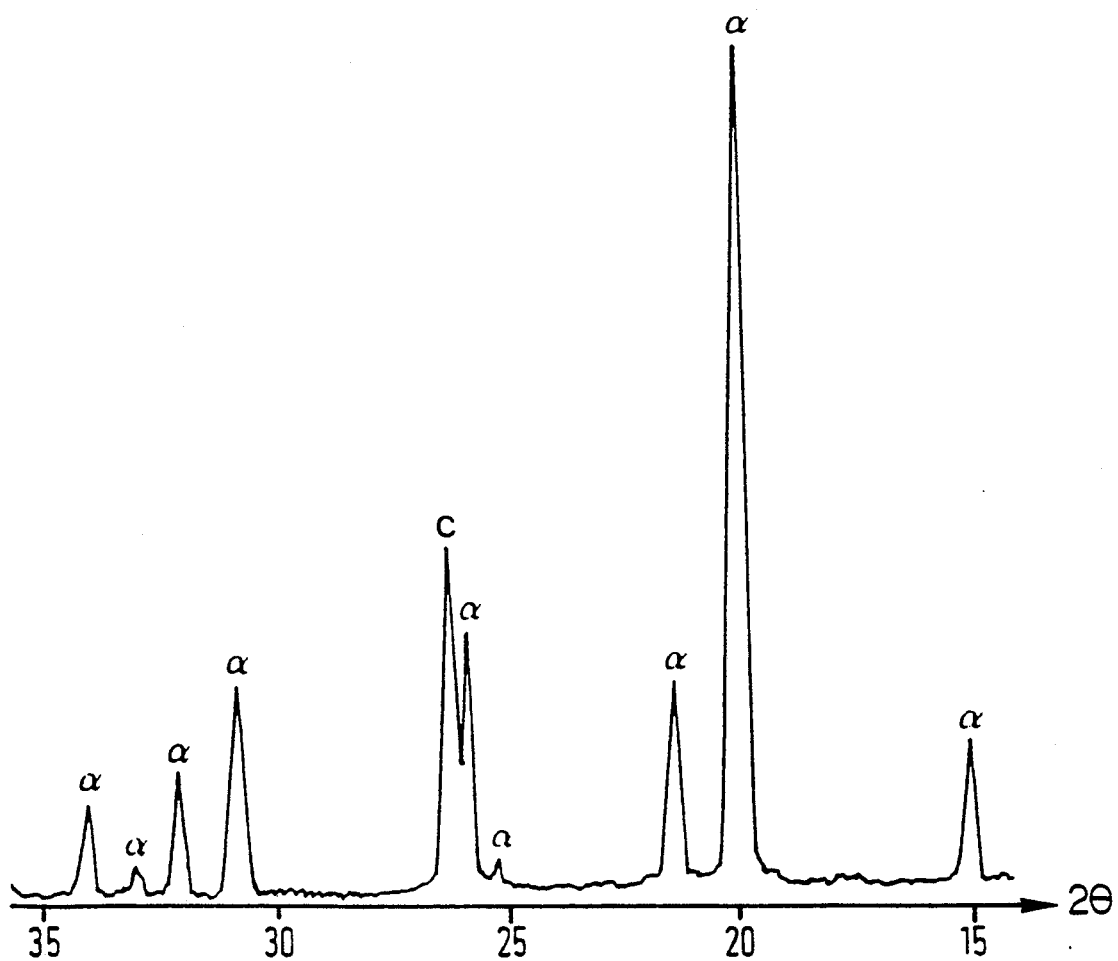
FIG. 6c is an X-ray diffraction diagram of the cathode material of button cell $B_1$ at the end of its first recharge (point $C_1$ in FIG. 3)

FIGS. 6b and 6c are X-ray diffraction diagrams of cathode materials as obtained at the end of discharging and at the end of charging cell $B_1$ and they correspond respectively to point $D_1$ in FIG. 2 and to point $C_1$ in FIG. 3. Diffraction diagram 6b serves to identify the $\delta$ phase of $LiV_2O_5$ in the cathode material of cell $B_2$ discharged down to 2.8 V. The structure of this $\delta$ phase has been determined by Cava et al. (R. S. Cava, A. Santoro, O. W. Murphy, S. M. Zahurak, R. M. Fleming, P. March, R. S. Roth, J. Solid State Chem. 65, 6371, 1986). After cell $B_1$ was fully recharged, comparison of diffraction diagram 6c diagram 6a shows that the cathode material has an $\alpha$ $V_2O_5$ structure which is identical to that of the initial substance.

Figure 6D:
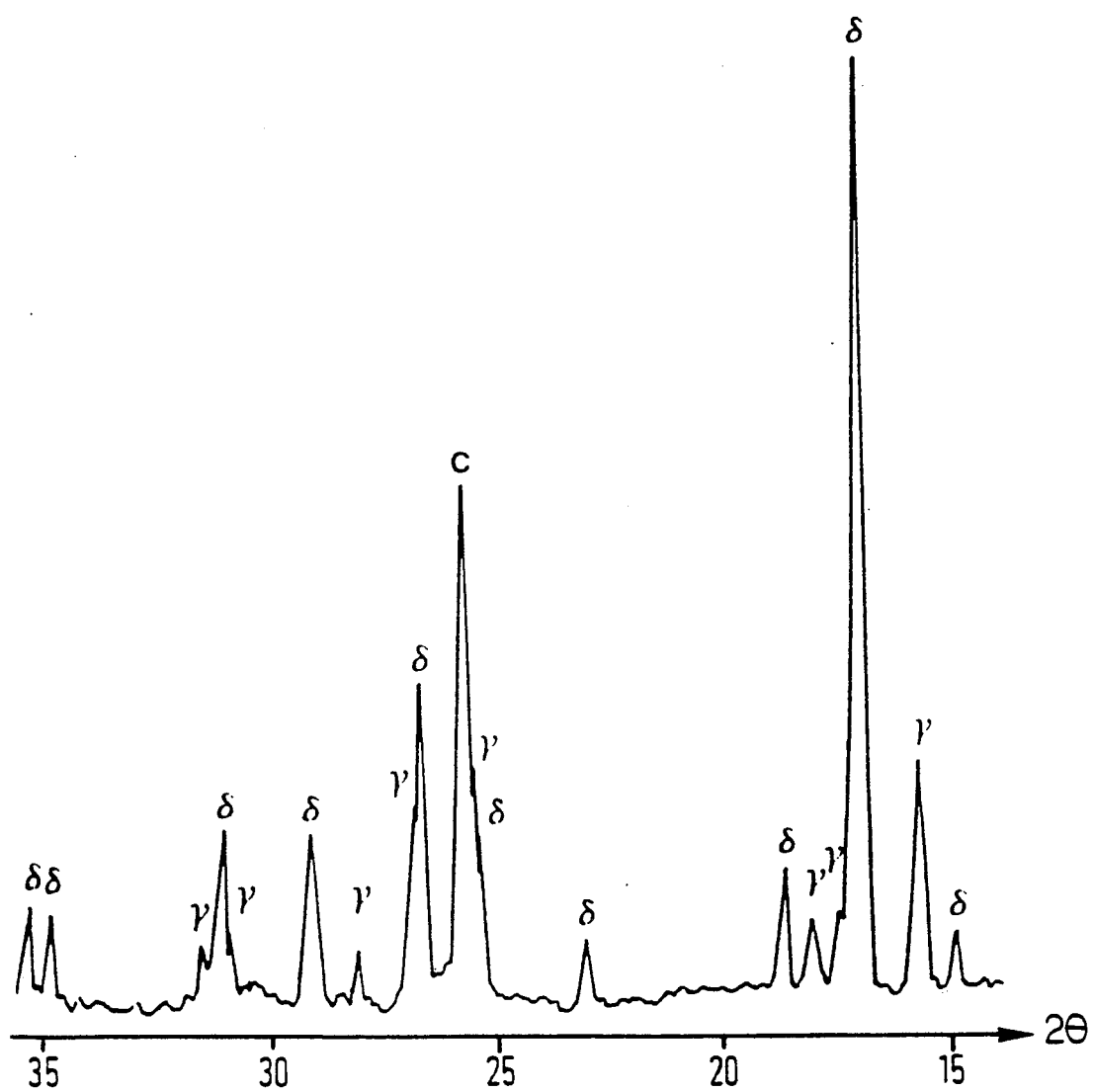
FIG. 6d is an X-ray diffraction diagram for the cathode material of button cell $B_2$ at the end of its first discharge (point $D_2$ in FIG. 2)
Figure 6E:
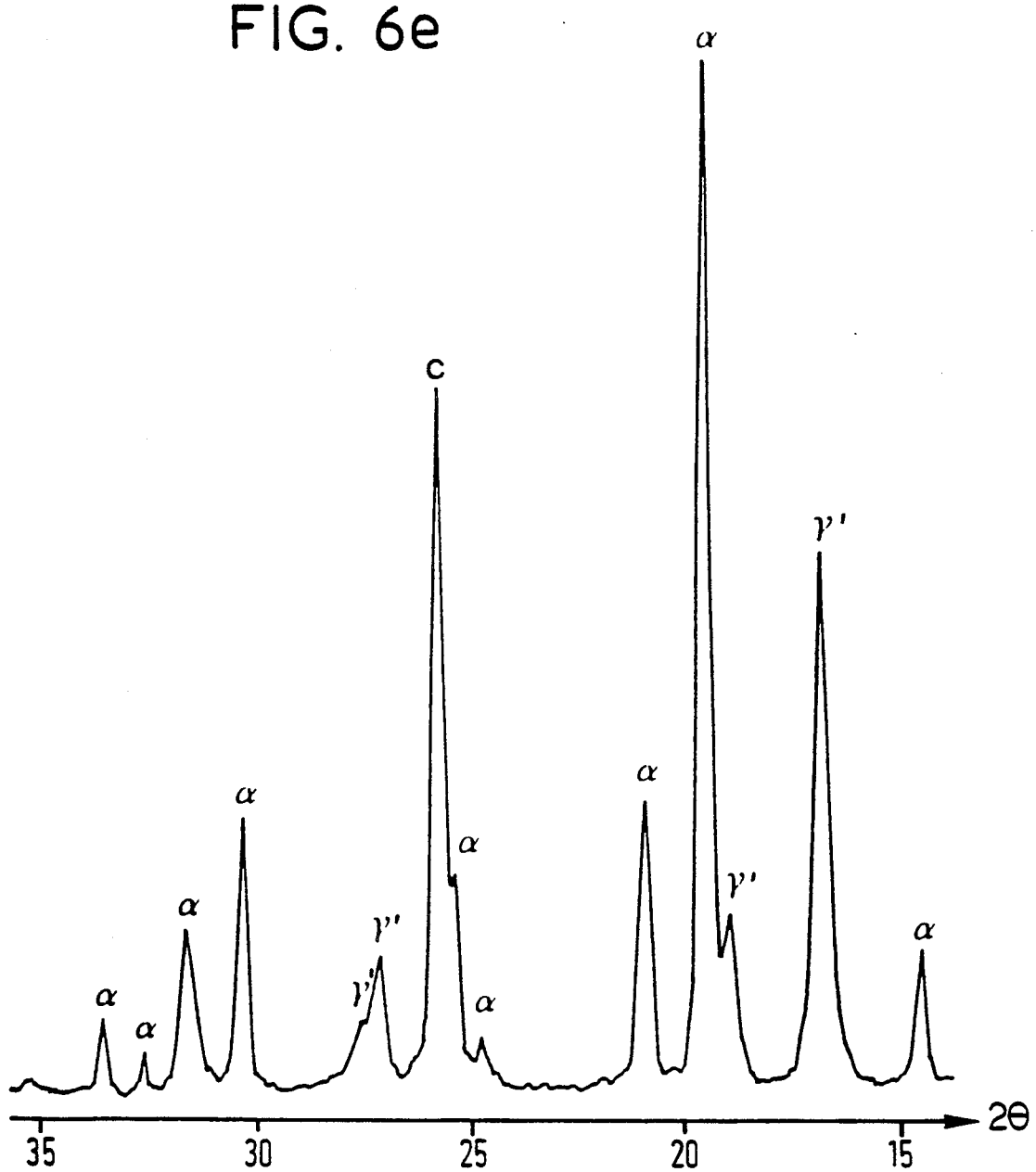
FIG. 6e is an X-ray diffraction diagram of the cathode material of button cell $B_2$ at the end of its first recharge (point $C_2$ in FIG. 3)

FIGS. 6d and 6e are X-ray diffraction diagrams as obtained respectively with the cathode material of the cell $B_2$ of the invention at the end of discharging and at the end of charging, and they correspond respectively to point $D_2$ in FIG. 2 and to point $C_2$ in FIG. 3.

Diffraction diagram 6d demonstrates the appearance of an additional phase in the cathode material of cell $B_2$ when discharged down to 2 volts, which additional phase corresponds to the $\gamma$ $LiV_2O_5$ phase obtained at high temperature by reacting $LiVO_3$ with $V_2O_5$ (J. Darriet, P. Hagenmuller, Revue de Chimie Minerale, 8, 529–1971—and the references included therein). This new phase appears when discharging is continued beyond the insertion of one atom of lithium per mole of $V_2O_5$, and this result agrees with that obtained by S. Okada and J. Yamaki (Extended Abstracts, 176th Meeting of the Electrochemical Society, Hollywood, Oct. 15–20, 1989, p. 62).

Diffraction diagram 6e shows that unlike the material of cell $B_1$, the material of cell $B_2$ does not return to the initial $\alpha$ $V_2O_5$ state after being fully recharged. In addition to the $\alpha$ lines, additional lines are observed as being present and these turn out to be structurally isotypical of above-mentioned $\gamma$ $LiV_2O_5$. The displacement of these lines relative to those of $\gamma$ $LiV_2O_5$ (FIG. 6d) is representative of considerable change in the crystal parameters which can be explained by the de-intercalation of lithium within the cathode material. This new material obtained by de-intercalation of $\gamma$ $LiV_2O_5$ contains a new vanadium oxide which we call $\gamma'$ $V_2O_5$. The correlation between the results of analysis by X-ray diffraction and the electrochemical behavior of the cells $B_1$ and $B_2$ makes it possible to attribute the improvements characteristic of the invention such as increased discharge potential above 3 V and suitability for cycling to the formation of this $\gamma'$ phase.

EXAMPLE 2

Two other cells $B_3$ (prior art) and $B_4$ (in accordance with the invention) have been made having the structure shown in FIG. 1. The cell $B_3$ was subjected to an initial discharge at 2 mA down to 2.8 V and to charging at 1 mA up to 3.8 V. The cell $B_4$ was subjected to discharging at 2 mA corresponding to inserting 1.3 lithium atoms per mole of $V_2O_5$, i.e. to approximately halfway along the 2.3 V level, and to charging at 1 mA up to 3.8 V. Thereafter both cells $B_3$ and $B_4$ were subjected to identical cycling with the depth of discharge being limited, and having the following characteristics:

4-hour discharge at 1 mA, corresponding to inserting about 0.2 atoms of Li per molecule of $V_2O_5$; and charging at 1 mA up to 3.8 V.

Figure 7:
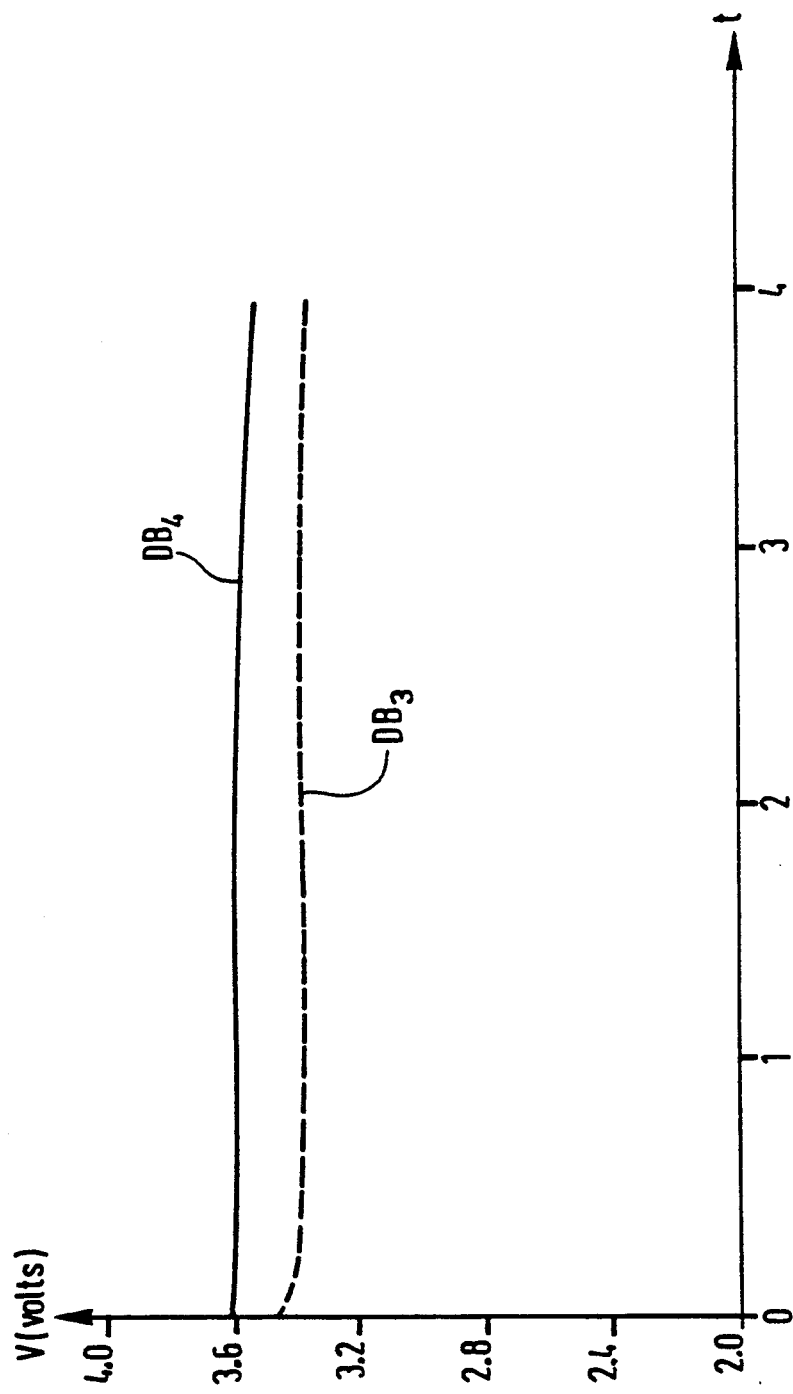
FIG. 7 shows the discharge curves of a prior button cell $B_3$ and a button cell $B_4$ of the invention while discharging at 1 mA over a period of four hours.
Figure 8:
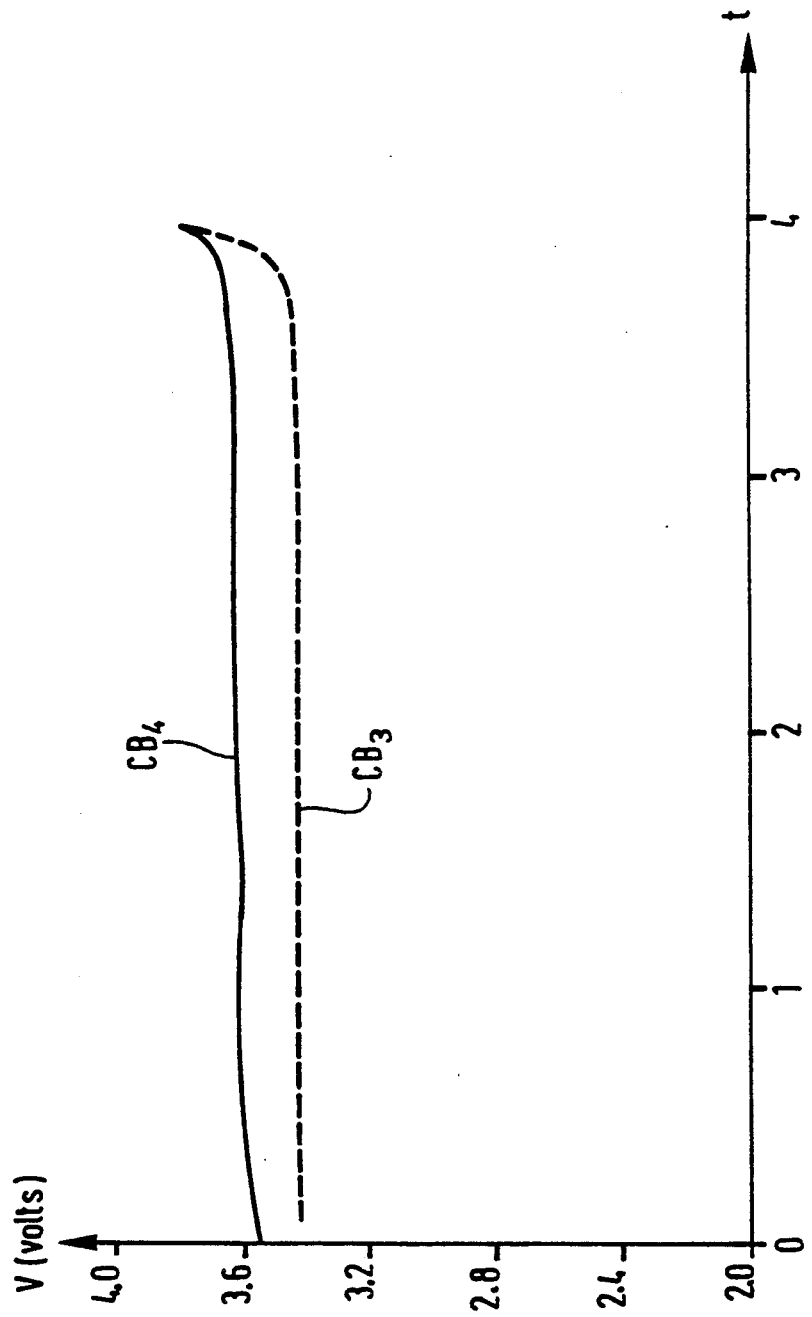
FIG. 8 shows the charging curves of the two button cells $B_3$ and $B_4$ at 1 mA up to 3.8 V.

FIG. 7 shows variation in the voltage V as a function of time t (in hours) during discharging (curve $DB_3$ for cell $B_3$ and curve $DB_4$ for cell $B_4$). It can be seen that cell $B_4$ of the invention has a discharge voltage of about 3.6 V, whereas cell $B_3$ operates at a voltage of about 3.4 V. This difference can also be seen in charging curves $CB_3$ and $CB_4$ of FIG. 8 which shows the variation in the voltage V as a function of charging time t (in hours).

Figure 9:
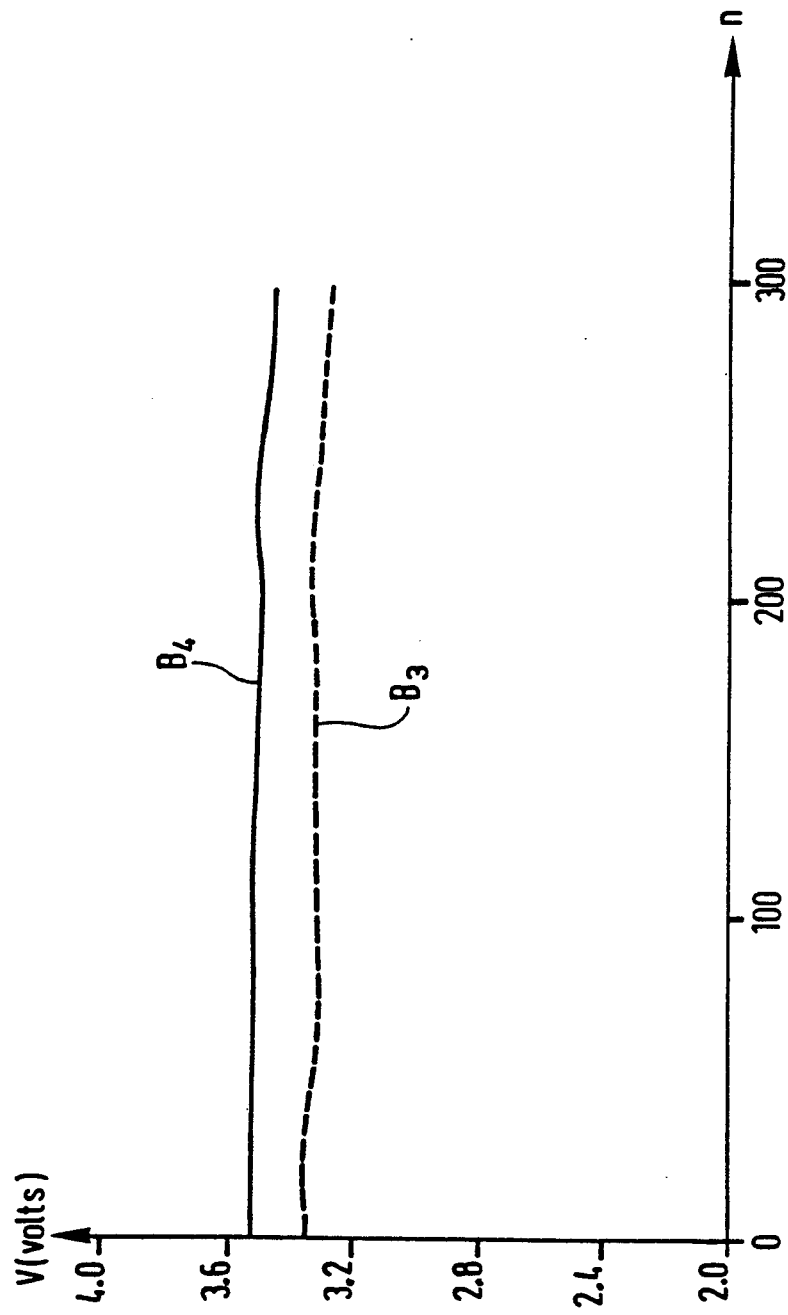
FIG. 9 is a graph showing changes in end-of-discharge voltage for the button cells $B_3$ and $B_4$ as a function of number of cycles, when discharging at 1 mA for four hours.

FIG. 9 shows the variation in voltage V at the end of discharging for 4 hours at 1 mA as a function of the number of cycles n for cells $B_3$ and $B_4$. It can again be seen that the voltage of $B_4$ is better than that of $B_3$ and that this parameter varies little even after 300 cycles.

The X-ray diffraction diagram of the cathode material of cell $B_4$ based on a sample taken after discharging down to 1.3 atoms of lithium being intercalated per mole of $V_2O_5$ and recharging up to 3.8 V, demonstrates that the above-mentioned $\gamma'$ phase of $V_2O_5$ is formed, thereby explaining the difference in behavior of the cells $B_3$ and $B_4$ during cycling, and in particular the increase in operating voltage which is one of the characteristics of the invention.

EXAMPLE 3

A prior art storage cell $B_5$ of the same type as in the preceding examples was made using a vanadium oxide taken from a different manufacturing batch and was subjected to 31 cycles of discharging at 2 mA down to 2.8 V, and of charging at 1 mA up to 3.8 V.

Figure 10:
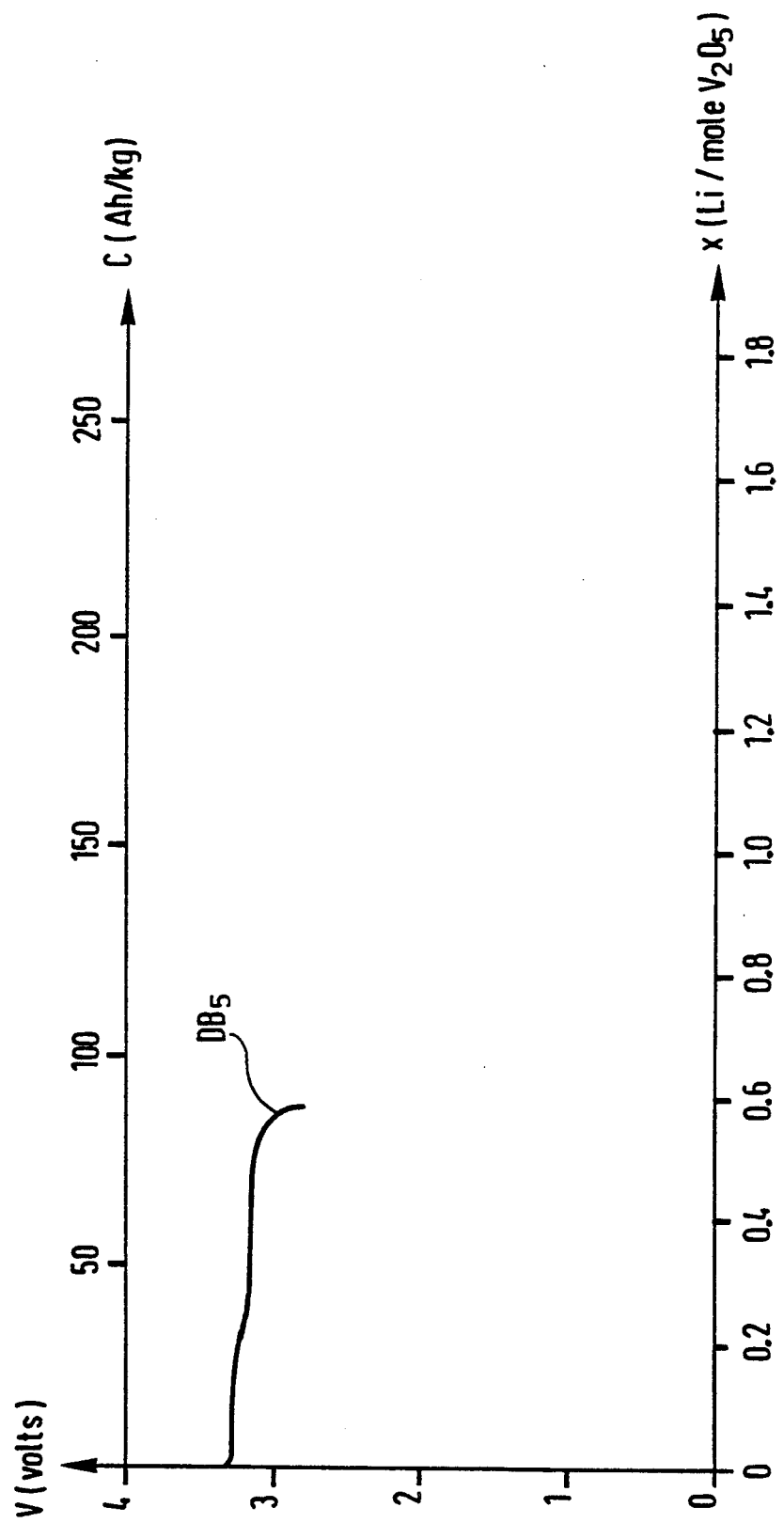
FIG. 10 shows the discharge curve of a prior art button cell $B_5$ made of mediocre quality of vanadium oxide and discharged down to 2.8 V.

The capacity delivered by this vanadium oxide was substantially lower than that of the previously tested oxide as can be seen from FIG. 10 which shows the discharge characteristic $DB_5$ of cell $B_5$ on its 25th cycle. The lower quality of the present oxide has been attributed, after chemical analysis and electron paramagnetic resonance investigations, to the presence of a larger proportion of $V^{4+}$ ions in the initial material. The measured specific capacity was equal to 87 Ah/kg, corresponding to 0.6 atoms of lithium being inserted per molecule of $V_2O_5$.

Figure 11:
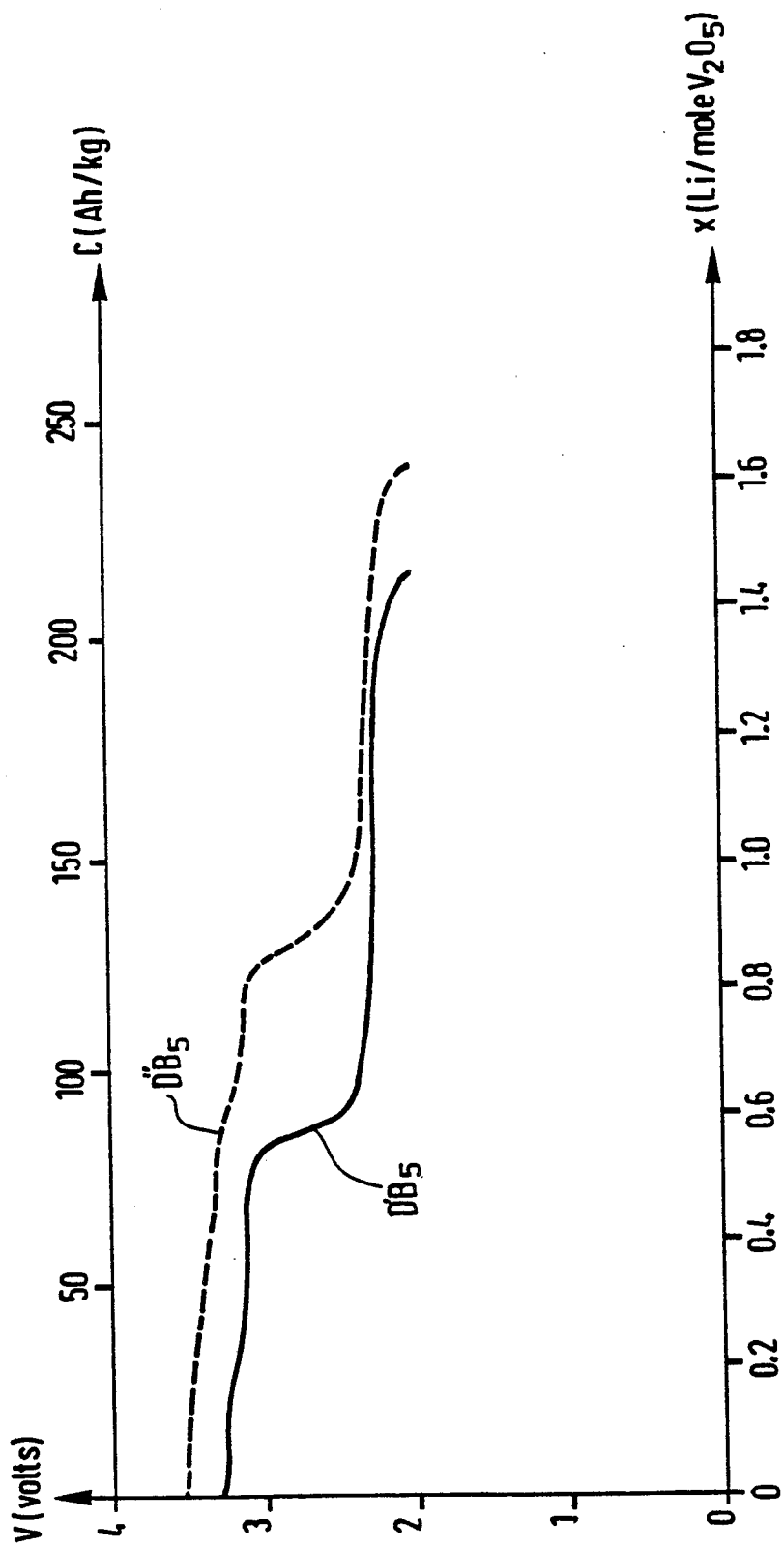
FIG. 11 shows discharge curves for a button cell $B'_5$ of the invention discharged down to 2.0 V.

The cell was then subjected to two cycles discharging at 2 mA down to 2 V and charging at 1 mA up to 3.8 V. FIG. 11 shows the characteristics $D'B_5$ and $D''B_5$ corresponding to the 32nd and 33rd discharges. It can be seen that the first discharge down to 2 V (32nd discharge of this particular cell) had the effect of significantly altering the profile of the following discharge (33rd discharge) by increasing the duration of that discharge, particularly at voltages above 3 V, and by raising the upper voltage level or "plateau" of the discharge. This discharge thus serves to obtain a cell $B'_5$ of the invention.

Figure 12:
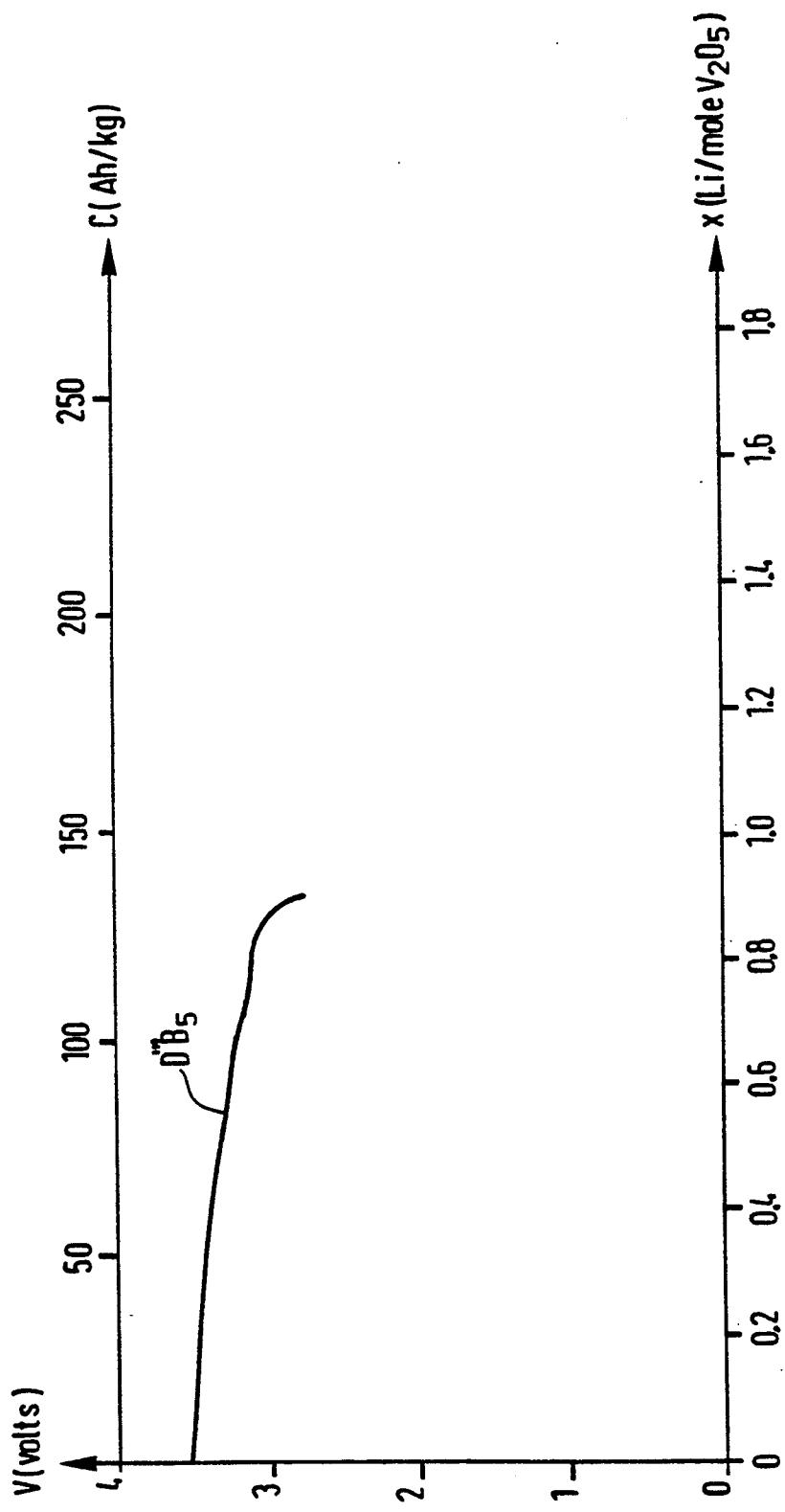
FIG. 12 shows the discharge curve for discharging button cell $B'_5$ down to 2.8 V after two cycles of operation between 2.0 V and 3.8 V.

Cycling was then continued in the initial voltage range of 2.8 V to 3.8 V, and the observed improvement in voltage and in capacity was maintained as is shown in FIG. 12 which shows the discharge characteristic $D'''B_5$ of cell $B'_5$ during its 40th cycle. The specific capacity was equal to 135 Ah/kg corresponding to 0.91 atoms of lithium being intercalated per molecule of $V_2O_5$, and the mean discharge voltage was 3.37 V. Prior to the two cycles performed between 2.0 V and 3.8 V, the specific capacity was no more than 87 Ah/kg, corresponding to 0.6 atoms of lithium being intercalated per mole of $V_2O_5$ and the mean discharge voltage was 3.19 V. The improvement provided by the invention can be seen clearly in FIGS. 13 and 14 which show the specific capacity and the mean discharge voltage respectively during cycling with discharging being stopped at 2.8 V, both before and after the two cycles that were performed between 2.0 V and 3.8 V. Discharging at the 2.3 V level followed by full recharging thus serves not only to regenerate the capacity of a mediocre quality vanadium oxide $V_2O_5$, but also to increase its mean discharge voltage by about 0.2 V.

Naturally, the invention is not limited to the embodiments described above.

We claim:

1. A rechargeable electrochemical cell comprising an anode of lithium or a lithium alloy, a cathode material initially of crystallized vanadium oxide prior to cycling, and an electrolyte in contact with each of the anode and cathode comprising a solution of a lithium salt in a non-aqueous solvent, wherein the cathode material contains, when in a reduced state, a $\gamma$ phase of $LiV_2O_5$ obtained by inserting from 0.9 to 2 atoms of lithium per molecule of $V_2O_5$ into said oxide upon discharging the cell and contains, when in an oxidized state, a $\gamma'$ phase of $V_2O_5$ obtained by chemically or electrochemically oxidizing the $\gamma$ phase upon charging the cell.

2. The electrochemical cell as in claim 1, wherein said cathode material has a capacity of not less than 88 Ah/kg at a discharge voltage of from greater than 3.3 V to 3.8 V, when the cell is electrochemically cycled between 2.0 V and 3.8 V.

3. The electrochemical cell as in claim 1, having a discharge curve during cycling which includes a plurality of distinct voltage levels situated above 3 volts, and a voltage level situated at substantially 2.3 volts.

4. The electrochemical cell as in claim 1, having a mean discharge voltage of greater than 3.5 volts when cycled with a depth of discharge of less than 74 Ah/kg.

5. The electrochemical cell as in claim 1, wherein the number of atoms of lithium per molecule of $V_2O_5$ approaches 2.

6. The electrochemical cell as in claim 1, wherein said non-aqueous electrolyte comprises a solvent selected from the group consisting of cyclic and linear ethers, esters, and mixtures thereof, and a solute selected from the group consisting of $LiAsF_6$, $LiCF_3SO_3$, $LiPF_6$, $LiClO_4$, and mixtures thereof.

7. The electrochemical cell as in claim 6, wherein the electrolyte is a solution of $LiAsF_6$ in a mixture of propylene carbonate, ethylene carbonate and dimethoxyethane.

8. A method of preparing a cathode material containing a $\gamma'$ phase of $V_2O_5$ from a cathode material initially of crystallized vanadium oxide by processing the cathode material in an electrochemical cell comprising an anode of lithium or a lithium alloy, the cathode material for processing, and an electrolyte in contact with each of the anode and cathode comprising a solution of a lithium salt in an non-aqueous solvent, wherein the cathode material contains, when in a reduced state, a $\gamma$ phase of $LiV_2O_5$ obtained by inserting from 0.9 to 2 atoms of lithium per molecule of $V_2O_5$ into said oxide upon discharging the cell and contains, when in an oxidized state, a $\gamma'$ phase of $V_2O_5$ obtained by chemically or electrochemically oxidizing the $\gamma$ phase upon charging the cell, comprising the steps of discharging the cell below 3 V to a discharge level situated at about 2.3 V, and then recharging the cell to about 3.8 V, providing that the minimum discharge voltage is not less than 2.0 V.

9. The electrochemical cell as in claim 1, wherein the $\gamma$ $LiV_2O_5$ phase is treated with a solution of bromine in acetonitrile to obtain the $\gamma'$ phase.

10. A method of regenerating, in situ, the cathode material of a rechargeable electrochemical cell, said electrochemical cell comprising an anode of lithium or a lithium alloy, a cathode material initially of crystallized vanadium oxide prior to cycling, and an electrolyte in contact with each of the anode and cathode comprising a solution of a lithium salt in a non-aqueous solvent, comprising the steps of discharging said cell to a discharge level situated at about 2.3 V, and then recharging the cell to about 3.8 V, providing that the minimum discharge voltage is not less than 2.0 V.

11. The electrochemical cell as in claim 1, wherein the $\gamma$ phase of the cathode material is obtained by discharging the cell to a discharge level situated at about 2.3 V.

12. The electrochemical cell as in claim 1, wherein the $\gamma'$ phase is obtained from the $\gamma$ phase of the cathode material by recharging the cell to about 3.8 V.

13. The method as in claim 10, wherein the cathode material contains, when in a reduced state, a $\gamma$ phase of $LiV_2O_5$ obtained by inserting from 0.9 to 2 atoms of lithium per molecule of $V_2O_5$ upon discharging the cell to a discharge level situated about 2.3 V, and the cathode material contains, when in an oxidized state, a $\gamma'$ phase of $V_2O_5$ obtained from the $\gamma$ phase of $LiV_2O_5$ upon recharging the cell to about 3.8 V.

* * * * *